United States Patent [19]

Vafiadis

[11] 4,198,089
[45] Apr. 15, 1980

[54] CAMPING UNIT

[76] Inventor: Ioannis Vafiadis, 49 Caruso Crescent, Brahma Lodge, Australia, 5109

[21] Appl. No.: 843,797

[22] Filed: Oct. 20, 1977

[30] Foreign Application Priority Data

Nov. 9, 1976 [AU] Australia .............................. 8064/76

[51] Int. Cl.² ......................... B60P 3/32; B60R 15/00
[52] U.S. Cl. .................................................... 296/165
[58] Field of Search ................ 296/23 R, 23 A, 23 F, 296/23 G, 23 MC

[56] References Cited
FOREIGN PATENT DOCUMENTS 31346 12/1967 Australia .............................. 296/23 R
49783 1/1969 Australia .............................. 291/23 R Primary Examiner—Richard A. Bertsch
Attorney, Agent, or Firm—Pearne, Gordon, Sessions

[57] ABSTRACT

An improved camping unit comprising a base adapted to be secured to the roof of a vehicle, a lid attached to the base by linkage means such that the lid can be swung from the base downwardly to form a side wall and an enclosed space adjacent the vehicle. Supporting rods are also pivoted to the base and the area between the base and lid is enclosed in its erected position by flexible material, the rods supporting the flexible material to provide the habitable area above the base and adjacent the side of the vehicle.

8 Claims, 4 Drawing Figures

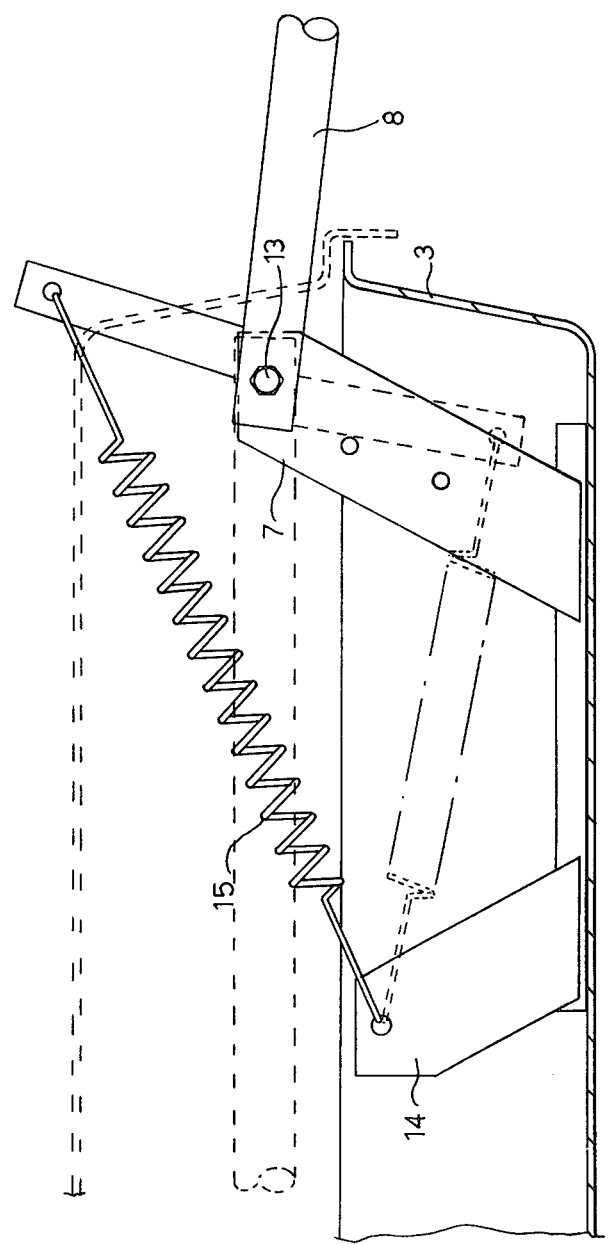

CAMPING UNIT

This invention relates to a camping unit, and more particularly to a camping unit which is attached to a luggage or roof rack on a vehicle and can be readily converted from a travelling position to a camping position.

BACKGROUND OF THE INVENTION

Various forms of camping units or tent like structures are known, and these are known to be attached to the roof or a roof rack on a vehicle. These can be expanded to allow accommodation to be available in the area above the vehicle, and also forms are known which can be extended to include an enclosed base along the side of the vehicle.

Units which are mounted on the vehicle include Australian Pat. No. 209,168 where the whole unit is of a tent like construction, the unit in its stored position having a flexible cover. Australian Specification No. 49783/69 has a roof hinged at one end to its base so that on erection a triangular compartment is formed on the vehicle, but no extra area is provided adjacent the vehicle.

Australian Specification Nos. 31346/67, 12390/67, 401,115 and 466,621, disclose various expanding tents, caravans and trailers, but in all these instances the rigid cover material is hinged to form in its extended position a horizontal floor position either on the ground or supported above thereof.

It is an object of this invention to provide an improved form of camping unit of this nature where accommodation is provided on the vehicle itself and also an area is available beside the vehicle for accommodation, this area having a relatively substantial side wall to provide a secure area adjacent the vehicle.

SUMMARY OF THE INVENTION

Thus there is provided according to the invention an improved camping unit camprising a base adapted to be secured to the roof of a vehicle, a lid attached to the base by linkage means such that the lid can be swung from the base downwardly to form a side wall of an enclosed space adjacent the vehicle.

BRIEF DESCRIPTION OF THE DRAWINGS

FIG. 4 is an enlarged view of the hinge.

DESCRIPTION OF THE PREFERRED EMBODIMENT

Figure 1:
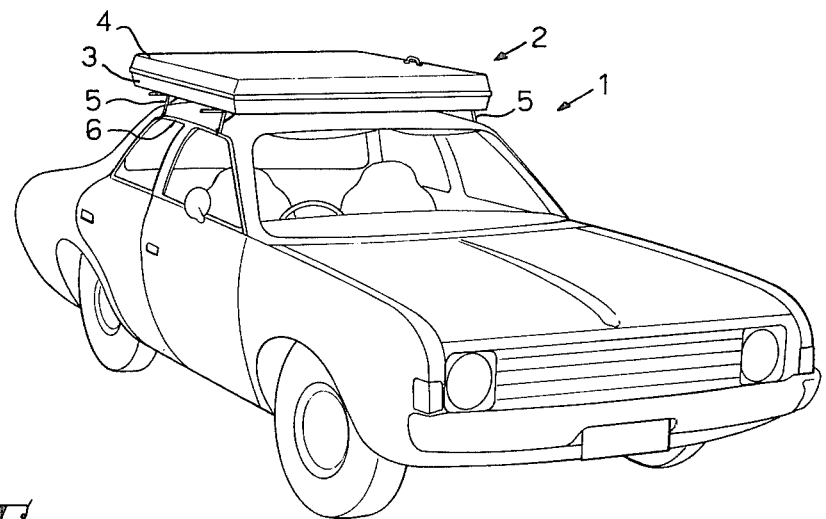
FIG. 1 shows a vehicle with the unit in the travelling position.
Figure 2:
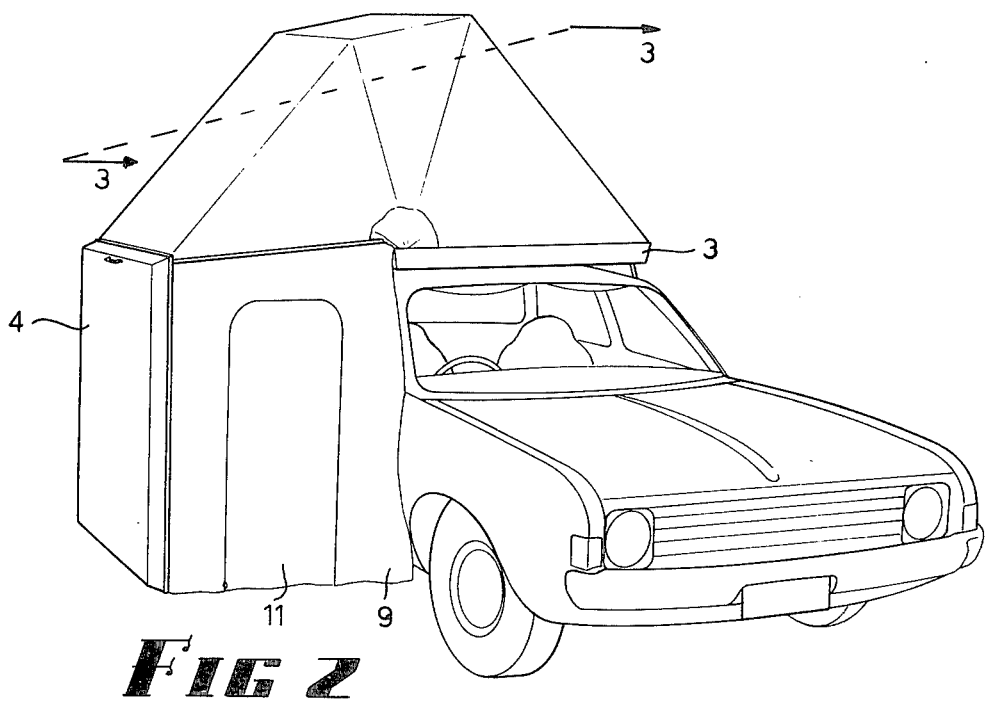
FIG. 2 is a similar view but in the erected condition.
Figure 3:
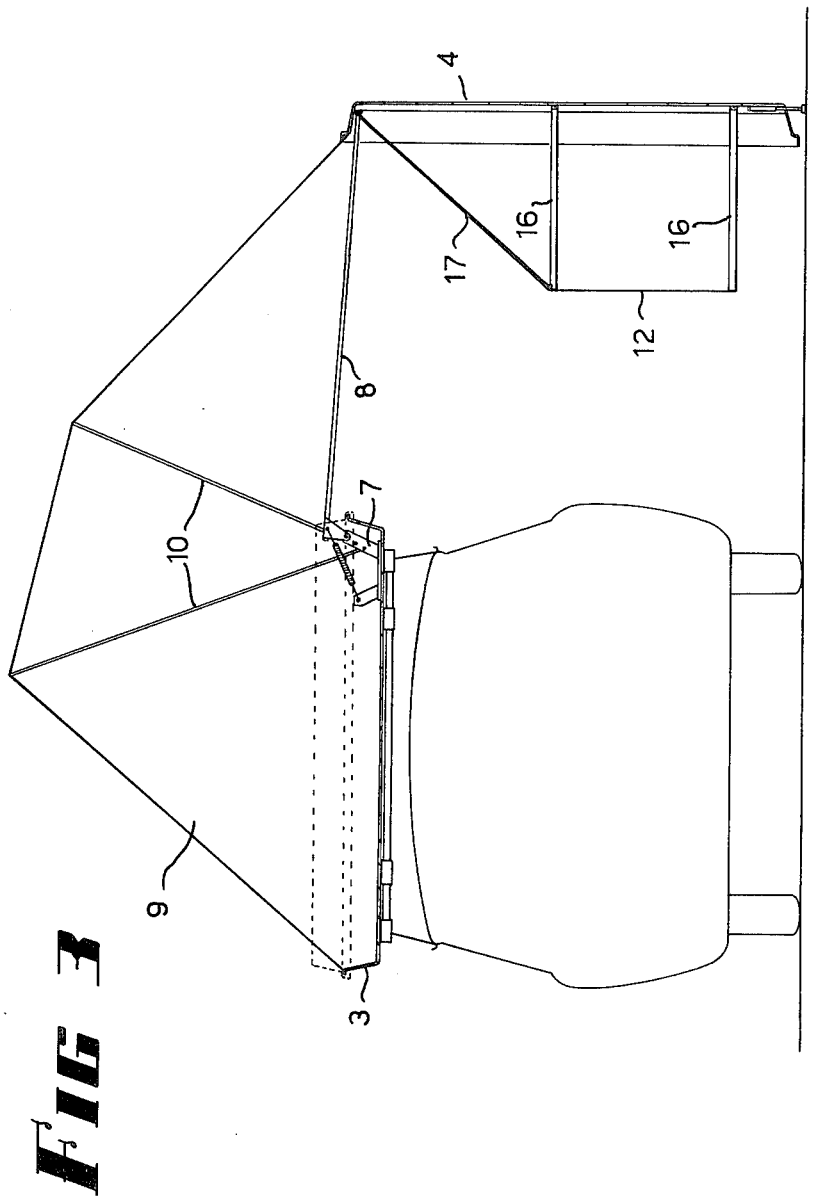
FIG. 3 is a sectional view along the lines 3—3 of FIG. 2.

Referring to the drawings there is shown a vehicle 1 having the unit 2 affixed to the roof of the vehicle. The unit 2 comprises a base 3 and a lid 4.

Preferably the base 3 is provided with legs 5 or the like which support the base on a roof of a vehicle, the legs 5 preferably in conventional manner engaging in the gutter 6 around the edge of the roof and provided with clamping means to clamp the legs into the gutter.

The base 3 is formed with upstanding side edges and the lid 4 is similarly shaped so that a hollow box like cavity is formed.

At each end of the base 3 at one side thereof there is provided a bracket 7, each bracket 7 having a link 8 pivoted thereto and pivoted to the lid 4, this link when the lid 4 is in its closed position on the base 3 extending across the base 3 and is attached to the lid 4 on the opposite side of the base to which the link is attached to the base. Thus when the lid 4 is lifted from the base the side opposite to the bracket side is pivoted up around by this link 8 so that the side of the lid which is on the same side as the bracket on the base can then be moved away from the base and lowered to rest on the ground with the lid being still attached to the base by the main link extending across to the bracket on the base. The lid is thus positioned vertically on the ground spaced a distance from the vehicle.

Suitable materials such as canvas 9 or the like material is attached to the lid and the base, and further a spread of links 10 are attached to the canvas and pivoted to the brackets 7, this spread of links being spaced around the canvas so that when the lid is in position on the ground that the canvas extends upwardly from the opposite side of the base around in a generally stepped or curved manner to the side of the lid which is now uppermost.

The canvas also extends downwardly at each end from the main link area to the ground to thus fully enclose the area adjacent the vehicle a suitable doorway 11 being provided if desired by a zippered panel. The lid thus rests on the ground and is in a relatively stable position and is supported at its upper end by the main link 8 extending across to the bracket on the base.

If desired the lid can be pegged or pinned to the ground in order to increase stability.

The link 8 has a member 12 fixed thereto, the link being hinged to the bracket 7 by pivot 13. A small bracket 14 is also affixed to the base 3, and a spring 15 acts between the small bracket 14 and the end of the member 12. It will be seen that the spring 15 when in the erected position of the lid as shown in full lines of FIG. 4 acts to assist in lifting of the lid. Similarly as shown in dotted lines when the lid is closed, it also acts to assist in opening of the lid, a position of least extension of the spring being intermediate the two extreme positions.

The operator then can lift the side nearest the brackets and by lifting and walking backwardly the lid can be lowered to the ground. The provision of the spring makes the unit such that it can be manipulated by one person.

The base 3 on the vehicle is provided with a mattress and the other bedding and if desired further bedding and camping equipment carried in the space between the lid and the base.

In a further alternative, the base can simply be a frame attached to the roof of the vehicle, and have canvas or like material attached to and stretched between the frame, so that the base may be likened to a canvas stretcher. The lid thus can have side to engage the base frame and enclose the area between the stretched canvas and the lid.

In one form also the lid 4 on its inner surface can have camping equipment attached thereto as by hinging or the like, and even a bed or even two beds 16 could hinge to this lid so that the beds can be swung downwardly from the lid to form further beds suitable for accommodation of one or two adult persons. The beds 16 can be supported by flexible members 17 attached to the top of the lid 4.

The base is of a size to accommodate two adult people and if desired further accommodation can be required on the ground formed by the enclosure if desired.

On the lid instead of a bed or in addition to a bed, tables can be hinged thereto to be swung outwardly and be supported on legs and if desired camp stools or chairs can also be carried in the lid area or on the base as desired.

Thus the lid by being attached in this manner can be swung from the sealing position to the open or standing position beside the vehicle, and in this manner the lid forms a rigid and substantial wall to the side of the enclosure and as noted above can also form a support and basis for other furniture such as beds, tables, chairs and the like.

The lid can have suitable adjustable supports to engage the ground so that the lid itself is not damaged to allow adjustment for unevenness of the ground, and the lid in position on the base has a flange which overlies the base and is clipped and clamped in position to form a watertight and weatherproof seal on the base to protect the bedding and other camping equipment stored therein.

The end flaps of the canvas 9 can be provided with buttons or studs or the like so that these portions can be attached to the end portions of the now vertical lid 4 to form a relatively weatherproof compartment or room.

Preferably the base 3 and the lid 4 are formed of fibreglass with the brackets being attached to the base and lid by bolts or the like.

The canvas material is folded up into the base during the folding of the lid back onto the base, the end portions of the canvas firstly being folded up so that the canvas is enclosed in the box formed by the lid and base.

In a further alternative in order to assist in opening the lid, the lid may be lifted on the side opposite the side to which it is moved, and a strut or rod used to prop that side up. Preferably the rod has a hook at its end to engage the lid, and the lid can then be grasped at its side opposite the rod and then moved and swung downwardly to its erected position. As the rod is hooked to the lid, the rod will also move, and after erection it is merely necessary to unhook the rod for removal.

I claim:

1. An improved camping unit for attachment to the roof portion of a vehicle, said unit comprising a base adapted to be secured to the roof portion of a vehicle, a structurally rigid lid connected to said base by linkage means such that the lid can be swung downwardly as an integral unit to be situated generally vertically adjacent to but spaced from the vehicle thus forming a side wall of an enclosed space adjacent the vehicle, said linkage means supporting the now upper edge of the lid from the base.

2. An improved camping unit for attachment to the roof portion of a vehicle, said unit comprising a base adapted to be secured to the roof portion of a vehicle, a lid connected to said base by linkage means such that the lid can be swung downwardly as an integral unit to be situated generally vertically adjacent to but spaced from the vehicle, thus forming a side wall of an enclosed space adjacent the vehicle, said linkage means supporting the now upper edge of the lid from the base, said linkage means including a bracket on one side of the base adjacent each end thereof, a link pivoted to each bracket and pivoted to the opposite side of the lid when the lid is in position on the base so that the side of the lid adjacent the bracket is moved away from the base and lowered to the ground.

3. An improved camping unit for attachment to the roof portion of a vehicle as defined in claim 2 wherein flexible material encloses the space between the base and lid when the lid is situated spaced from the base.

4. An improved camping unit for attachment to the roof portion of a vehicle as defined in claim 3 wherein rods support the flexible material, said rods being pivoted to said bracket and attached to the flexible material.

5. An improved camping unit for attachment to the roof portion of a vehicle as defined in claim 2 further characterised by a spring acting between said link and a further barcket, said spring assisting the opening of the lid from the closed position and assisting in raising the lid from the position on the ground.

6. An improved camping unit for attachment to the roof portion of a vehicle as defined in claim 1, wherein said lid is arranged to exteriorly overlie the base in a stowed position and to provide a self-supporting wall extending between the linkage means and the ground in its side wall forming position.

7. An improved camping unit for attachment to the roof portion of a vehicle as defined in claim 1, wherein said lid has an area substantially equal to the area of the base.

8. An improved camping unit for attachment to the roof portion of a vehicle as defined in claim 1, wherein said lid is arranged to exteriorly overlie the base in a stowed position, and said linkage means extends between the base on one side and the lid on the opposite side to dispose the lid a distance from the vehicle about equal to the width of the base when the lid is swung downwardly to its side wall forming position.

* * * * *